April 26, 1960

F. C. BREWSTER ET AL 2,933,945

AUTOMATIC TRANSMISSION CONTROL DEVICE

Filed April 16, 1957

INVENTORS.
Franklin C. Brewster
Reynald E. Thompson
By Mueller & Aichele
Attys.

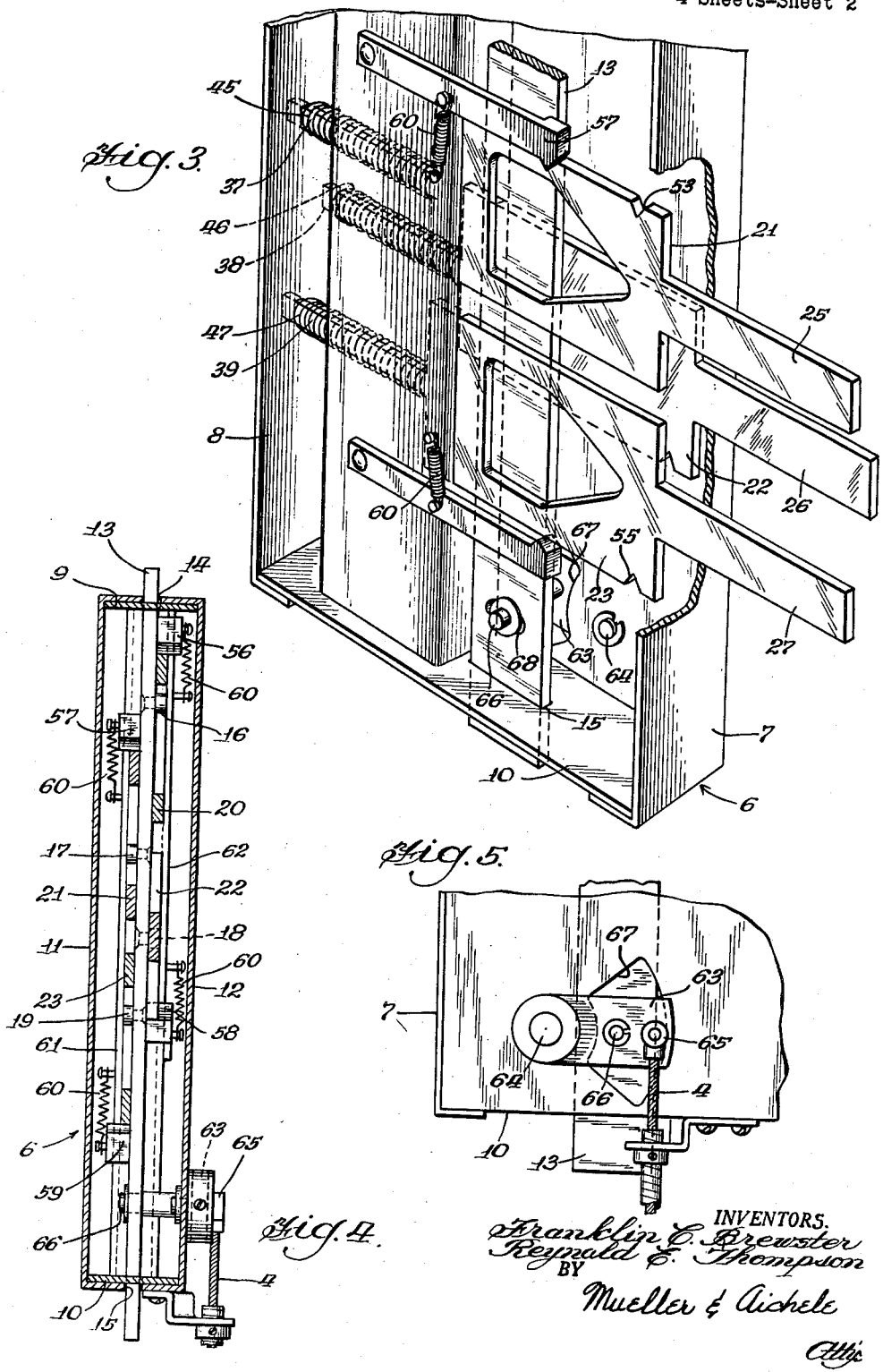

April 26, 1960   F. C. BREWSTER ET AL   2,933,945
AUTOMATIC TRANSMISSION CONTROL DEVICE
Filed April 16, 1957   4 Sheets-Sheet 3

INVENTORS.
Franklin C. Brewster
Reynald E. Thompson
BY
Mueller & Aichele
Attys.

April 26, 1960 F. C. BREWSTER ET AL 2,933,945
AUTOMATIC TRANSMISSION CONTROL DEVICE
Filed April 16, 1957 4 Sheets-Sheet 4
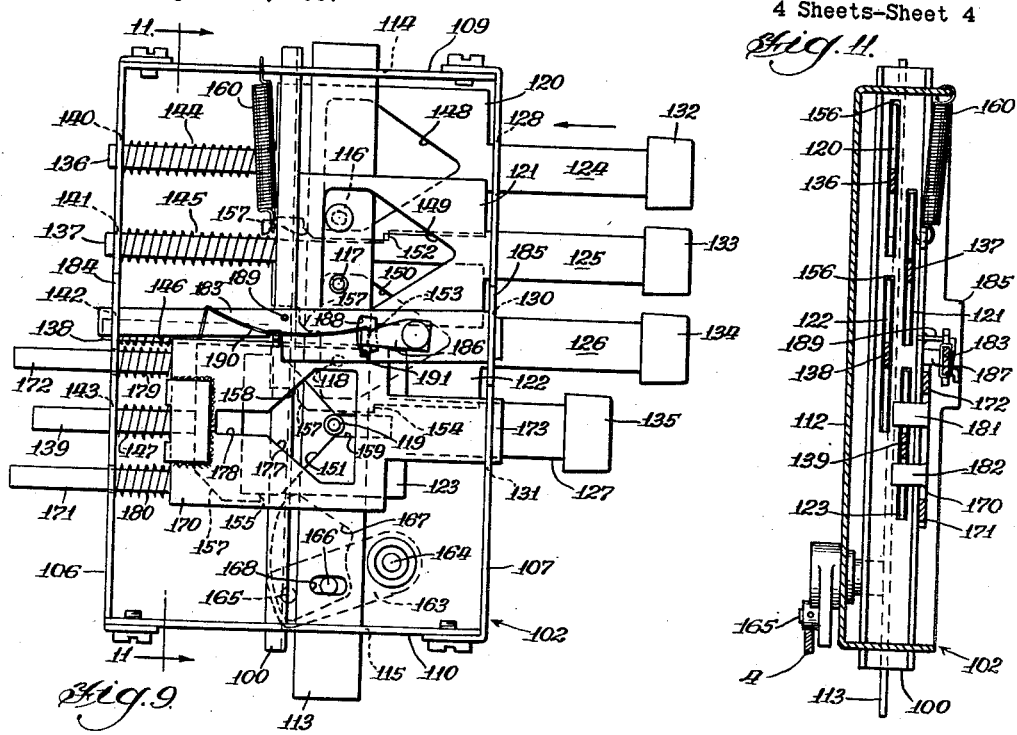
Fig. 9
Fig. 11
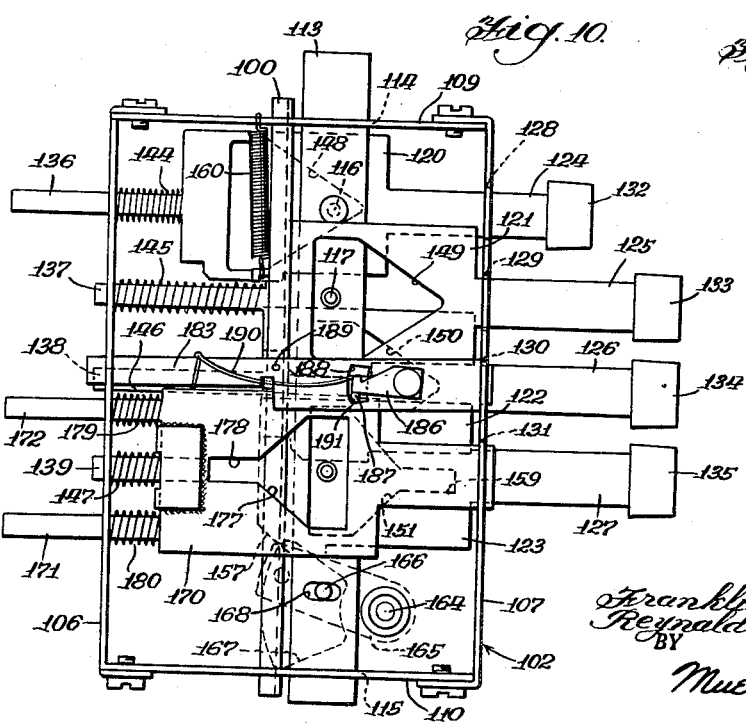
Fig. 10
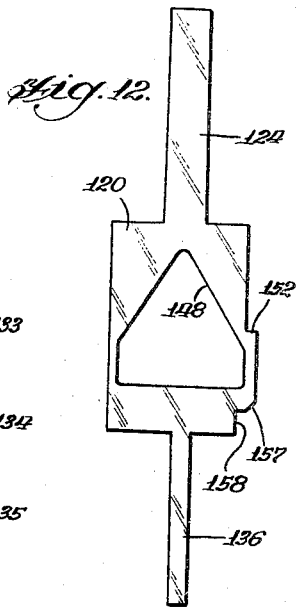
Fig. 12
INVENTORS.
Franklin C. Brewster
Reynald C. Thompson
BY
Mueller & Aichele
Attys.

United States Patent Office 2,933,945
Patented Apr. 26, 1960

2,933,945

AUTOMATIC TRANSMISSION CONTROL DEVICE

Franklin C. Brewster, Franklin Park, and Reynald E. Thompson, Mount Prospect, Ill., assignors to Motorola, Inc., Chicago, Ill., a corporation of Illinois Application April 16, 1957, Serial No. 653,134

11 Claims. (Cl. 74—473)

This invention relates to new and useful improvements in positioning devices and more particularly to a selector device for an automatic transmission for an automobile in which there are provided a plurality of key slides which are movable to set a main slide bar in a position corresponding to a desired setting, with the actuation of any one key slide releasing the key slide which was previously actuated.

In the development of the modern automobile, there has developed a considerable demand for fully automatic transmissions in which the automobile is provided automatically with a desired gear setting according to the setting of a selector mechanism mounted on the steering wheel or on the dashboard. Automatic transmissions which are now in use generally include drive gear, a low gear, reverse gear and neutral gear settings. If the transmission is set in the drive gear setting the automobile will start out in low gear and automatically shift through an intermediate gear setting into high gear upon reaching a predetermined speed. If it is desired to operate the automobile in low gear or in reverse gear, the selector mechanism must be set at the appropriate gear setting. The neutral gear setting is generally used during idling and during the starting of the motor. A similar arrangement of gear settings is used in automobiles which use a variable torque convertor. In the past the selector mechanisms which have been used have consisted of a lever mounted on the steering wheel post which is movable to any of the desired settings of the transmission and which actuates a cable for adjusting the setting of the transmission in accord with the setting of the transmission lever.

There has recently developed a demand for the elimination of the automatic transmission selector lever from the steering wheel post and the substitution of a simple pushbutton device on the dashboard which will select a desired gear setting upon the depression of a pushbutton which is marked for the desired setting. It is necessary in such a pushbutton transmission control that no unsafe condition may arise in the event that the pushbuttons are not actuated properly. In some pushbutton devices it is possible, in the event that a pushbutton is not completely actuated, for the previous button to be released without establishing the new setting. This type of operation results in the occurrence of a condition where no pushbutton is actuated and the transmission control is not held in any fixed position. In a proper pushbutton control device some means must be provided to avoid the occurrence of such an unsafe condition.

It is therefore one object of this invention to provide a new and improved selector device for automobile automatic transmissions in which the desired gear setting of the transmission is selected by depressions of a pushbutton actuator.

Another object of this invention is to provide an improved pushbutton actuator controlled positioning device in which the actuation of any one actuator releases and resets the previously actuated actuator.

Another object of this invention is to provide an improved pushbutton actuator controlled positioning device for an automobile automatic transmission in which the transmission will assume a selected safe position in the event that one of the pushbuttons is partially actuated and released with the result that no pushbuton is in an acuated position.

A feature of this invention is the provision of a positioning device having a longitudinally slidable positioning bar which is actuated by the coaction of pins spaced longitudinally of the bar with one of a plurality of laterally movable slide members having V-shaped cam surfaces each cooperable with one of the pins to locate the bar in a predetermined position and to return from an actuated position the slide member last actuated.

Another feature of this invention is the provision of a positioning device having a bar member which is longitudinally slidable and which is positioned by the coaction of laterally movable slide members with pins on the bar and which has latch members for holding the slide members in an actuated position and which are releasable upon movement of the bar to a new position by another one of the slide members.

A further feature of this invention is the provision of a positioning device having a bar member which is longitudinally slidable and which is positioned by a coaction of laterally movable slide members with pins on the bar member, which has a latch means for holding the slide members in an actuated position and releasable upon movement of the bar to a new position by another one of the slide members, and which has a safety means to establish a selected safe position for said bar member in the event that none of said slide members are in a properly actuated position.

A still further feature of this invention is the provision of a positioning device for an automatic transmission for automobiles having a bar member which is longitudinally slidable to determine the gear setting of the automatic transmission and which is positioned by coaction of laterally movable slide members with pins on the bar member and which includes a safety slide member operable to establish the bar member in a neutral gear setting upon occurrence of a condition in which none of the slide members are in a properly actuated position.

Other objects and features of this invention will become apparent from time to time throughout the specification and claims as hereinafter related.

In the accompanying drawings, to be taken as part of this specification, there is clearly and fully illustrated two preferred embodiments of this invention in which drawings:

Fig. 3 is a perspective view of part of the positioning device as shown in Fig. 2;

Fig. 4 is a sectional view taken along the line 4—4 of Fig. 2;

Fig. 5 is a detail view showing the lever which connects the positioning bar to the transmission control cable;

3

Figure 2:
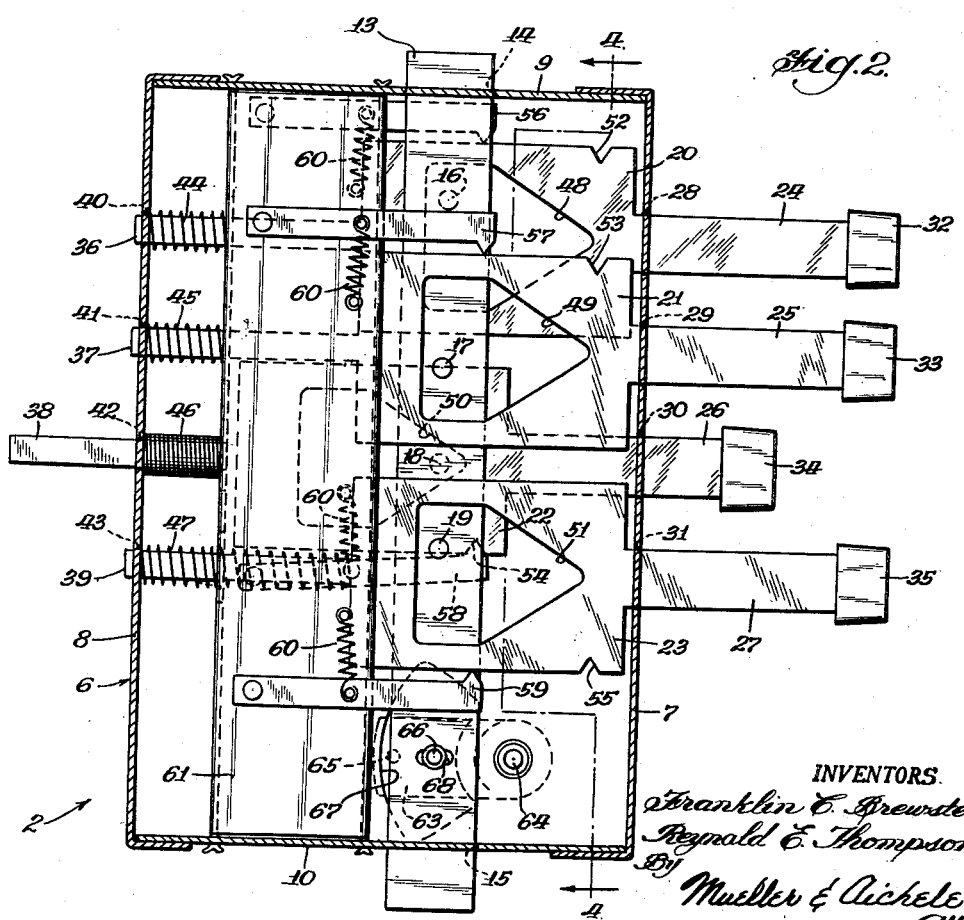
Fig. 2 is a plan view partially in section of this positioning device showing one of the slide members in an actuated position and holding the slide bar in a predetermined position.
Figure 6:
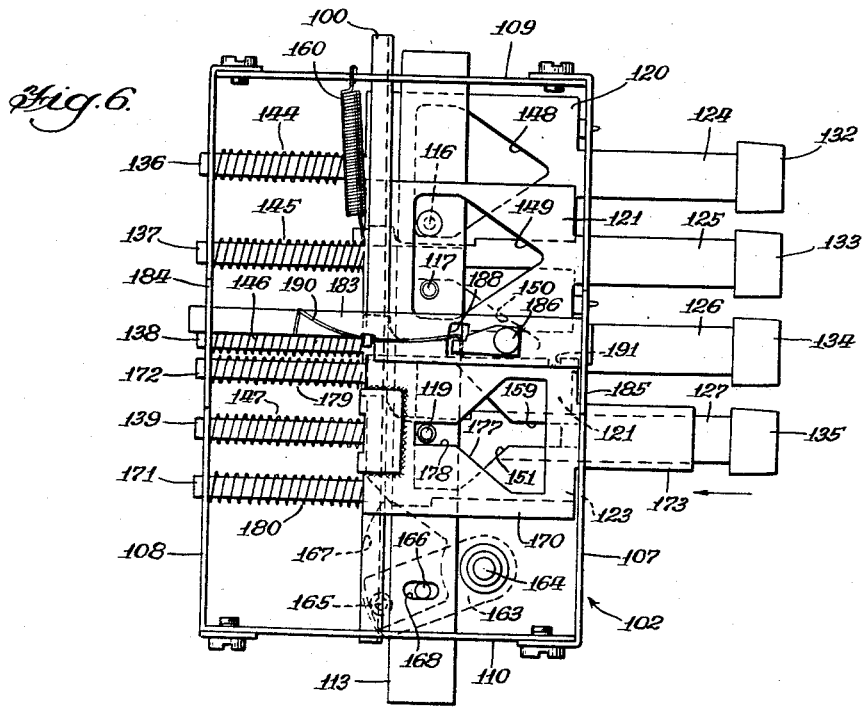
Figure 8:
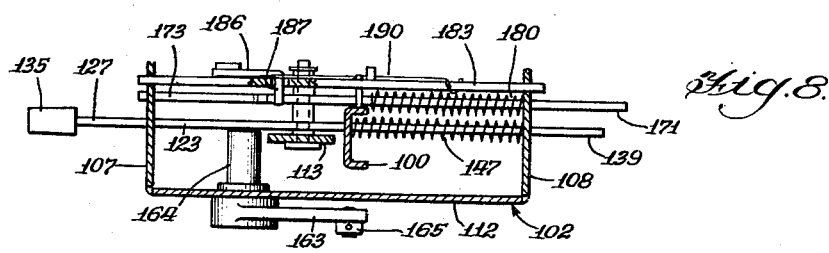
Figure 7:
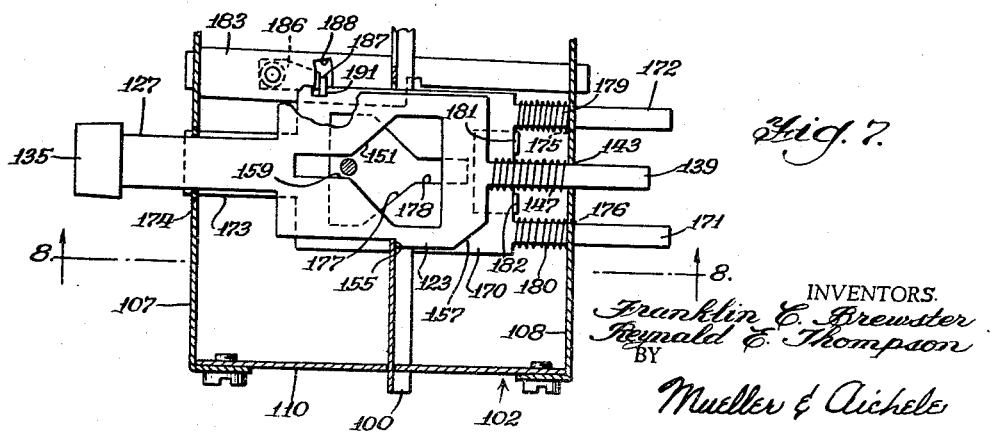

Fig. 6 is a view of a modification of the positioning device shown in Fig. 2 with a latch bar arrangement for securing the slide members in position and a safety slide member for moving the slide bar to a neutral position upon occurrence of a condition in which none of the slide members are in an actuated position;

Fig. 7 is a detail view of the positioning device shown in Fig. 6 and illustrating more completely the safety slide member and latching arrangement therefor;

Fig. 8 is a detail sectional view taken on the line 8—8 of Fig. 7 and showing the safety slide member and latching arrangement therefor;

Fig. 9 is a sectional view of the positioning device shown in Fig. 6 with the safety slide bar reset to a disengaged position and the neutral slide member actuated;

Fig. 10 is a view of the positioning device similar to that shown in Fig. 9 with another one of the slide bars in actuated position;

Fig. 11 is a sectional view taken on the line 11—11 of Fig. 9 and shows in more detail the latch bar arrangement for latching individual slide members in actuated position; and Fig. 12 is a detail view of one of the slide members which actuates the transmission positioning bar.

This invention comprises a new and improved positioning device of general application but which is especially adapted for the control of automatic transmissions in automobiles. In this positioning device, there is provided a longitudinally slidable bar which is adapted for connection to the control cable of an automatic transmission. The bar has a plurality of spaced pins positioned thereon which are arranged for actuation by one of a plurality of key slides which correspond to the desired setting of the automatic transmission. The key slides each have a V-shaped cam surface which is engageable with the pin on the slidable bar upon lateral movement of the slide to position the bar in a selected position. Each key slide is provided with a latch member which will hold the same in an actuated position. The movement of any other key slide will cause its V-shaped cam surface to engage one of the pins and move the slidable bar to a new position. This movement of the bar will cause the pin to move against the cam surface of the key slide which was previously actuated and latched in position to cause the latched key slide to move away from a latched position and unlatch the slide for movement to its initial position. In one embodiment of this selector device there is provided a safety slide member which is movable to set the slide bar in a selected safe position (corresponding to neutral gear setting) upon occurrence of a condition in which none of the key slides is properly actuated.

Figure 1:
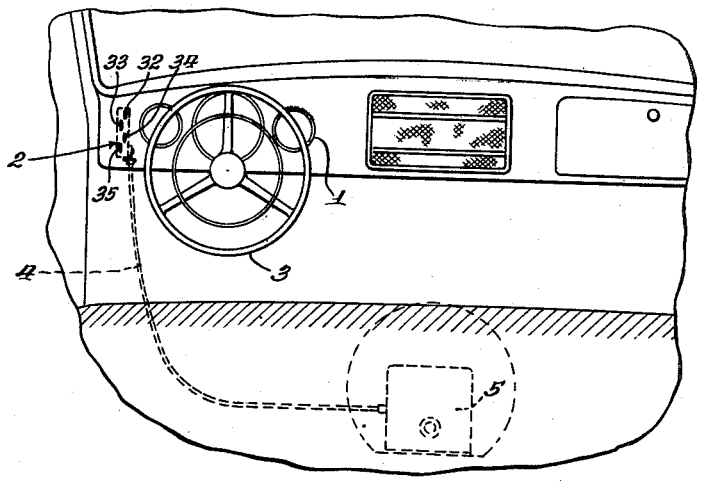
Fig. 1 is a view of the dashboard of an automobile showing a gear selector on the dashboard having pushbuttons for the desired gear settings and showing in dotted lines the cable connection to the automatic transmission which is actuated thereby.

In Fig. 1 there is shown a conventional dashboard for an automobile having a plurality of instruments 1 located thereon and showing a transmission selector box or positioning device 2 located to the left of the steering wheel 3. The transmission selector box 2 could be located elsewhere on the dashboard or could even be located on the steering wheel post if desired. A dotted connection 4 is shown extending from the transmission control to the automatic transmission 5, with the connection 4 being a control cable which actuates an automatic transmission 5 of conventional design. Most automatic transmissions have four gear settings. There are usually provided settings for driving and low forward gear speeds and for one reverse gear speed and a neutral gear setting. The selector device 2 is shown and described as having four settings of the type just mentioned. It should be noted, however, that this selector device could easily be altered to provide for additional forward or reverse gear settings or for a parking gear setting as is provided on some automobiles.

The selector device 2 comprises a box-shaped casing 6 having end walls 7 and 8, top and bottom walls 9 and 10, and side walls 11 and 12 respectively. Within the casing 6 there is positioned a longitudinally slidable bar 13 which extends through slits 14 and 15 in the end walls 9 and 10 respectively. The bar 13 is provided with a plurality of abutments or pins 16, 17, 18, and 19 which are spaced according to the desired positioning of the bar 13 for a selected gear setting of the transmission. The pins 17 and 19 project from one side of the bar 13 while the pins 16 and 18 project from the other side. There are also provided within the casing 6 a plurality of key slide members 20, 21, 22 and 23 which are positioned for sliding movement laterally of the bar 13. Key slides 21 and 23 are positioned on one side of the bar 13 while key slides 20 and 22 are positioned on the other side. The key slides have projections 24, 25, 26 and 27 which extend through guide slots 28, 29, 30 and 31 in the end wall 7 of the casing and which terminate in pushbuttons 32, 33, 34 and 35 respectively. The other end of the key slides have projections 36, 37, 38 and 39 thereon which extend through slots 40, 41, 42 and 43 respectively in the end wall 8 of the casing and which are surrounded by springs 44, 45, 46 and 47 respectively abutting the end wall 8 and the main portion of the respective key slides.

The key slides 20 and 22 have cutout portions which provide V-shaped cam portions 48 and 50 which are positioned to cooperate with pins 16 and 18 respectively. The key slides 21 and 23 similarly have V-shaped cam portions 49 and 51 which are positioned to cooperate with pins 17 and 19 respectively. The cam portions 48 to 51 are operable upon movement to locate one of the pins 16 to 19 in the V and thus fix the bar 13 in a predetermined position. The movement of the cam surface of the V-shaped cam portions against the respective pins will cause the bar 13 to be moved to a selected position. Similarly, the movement of the bar 13 may move one of the pins against the cam surface of one of the key slides and cause such slides to be moved toward the outer end wall 7. As will be apparent from Fig. 2 the angle of the sides of the V to the longitudinal axis of the key slides is less than 45° so that the actuating force applied to the key slides moves a greater distance than does the resisting longitudinal force transmitted by the bar 13. This provides a mechanical advantage which makes operation of the device by action of the key slides easier.

The key slides are provided with V-shaped notches 52, 53, 54, and 55 which are cooperable with latches 56, 57, 58 and 59 respectively. The latches are each provided with a spring 60 which urges each latch into engagement with the edge of the key slide with which it is to cooperate. The latches 56 and 59 and springs 60 are supported on spaced inner walls 61 and 62 within the casing 6.

On the outside of the casing wall 12 at the lower end portion thereof, there is supported a lever 63 which is pivotally supported as at 64. The lever 63 is connected through a pin 65 to one end of the cable 4 which extends to the transmission 5. The lever 63 has a pin 66 which extends through an arcuate aperture 67 in the wall 12 into a slot 68 in the bar 13.

In the operation of this transmission control the actuation of the automatic transmission 5 is determined by movement of the control cable 4 to selected positions by the lever 63. The movement of lever 63 is in turn governed by the longitudinal sliding movement of the positioning bar 13 through the interconnection of the pin 66 and slot 68. When pushbutton 34 is depressed, as in Fig. 2, the key slide 22 which is actuated thereby is moved against the force of the spring 46. The V-shaped cam portion 50 of the key slide 22 is engaged with the pin 18 on the positioning bar 13 to secure the bar 13 in a selected position. The movement of the key slide 22 into engagement with the pin 18 also brings the V-shaped latching notch 54 into latching position relative to the latch 58. The latch 58 is held by the spring 60 in the V-notch 54 and may be released upon application of a predetermined force to the key slide 22 in a direction toward the initial disengaged position of the key slide.

If another key slide 23 is moved by actuation of the pushbutton 35 the V-shaped cam portion 51 will engage the pin 19 and move the positioning bar 13 to a new position determined by the engagement of the V-shaped portion 51 and the pin 19. When the cam surface of the V-shaped cam portion 51 first engages the pin 19 in the position shown in Fig. 2 there will be imparted a downward movement to the bar 13. This downward movement will cause the pin 18 to bear against the cam surface of the V-shaped portion 50 and apply a force to move the key slide 22 to the right. Due to the reversal of cam action at this point, the mechanical advantage gained from the V-shaped portion is cancelled out in providing this unlatching force, although the advantage remains with respect to other longitudinal resisting forces simultaneously encountered in this initial action. This force which is applied through the action of the pin 18 on the cam portion 50 must be sufficient to overcome the force of the spring 60 on the latch 58 and move the slide 22 past that latch so that the latch is disengaged from the notch 54. Upon disengagement of the latch from the notch the key slide is returned by its spring to its initial disengaged position.

The same unlatching action and movement of the key slides and of the positioning bar takes place with each successive actuation of one of the key slides by its pushbutton. It is thus apparent that the actuation of any one of the key slides by its pushbutton will cause the positioning bar 13 to assume a new position as determined by the engagement of the V-shaped cam portion of that particular key slide and the pin on the bar 13 and the key slide previously actuated will be moved out of engagement with its latch so that its respective spring may move it to its initial disengaged position. Each movement of the positioning bar 13 will cause movement to be transmitted through the pin 66 and slot 68 to the lever 63 to establish a new position for the cable 4 and a new gear setting for the automatic transmission 5.

In Figs. 6-12 inclusive there is shown a modification of the selector device which is provided with a safety slide member for establishing the position of the transmission control bar in a neutral position upon occurrence of a selected unsafe condition. In this modified form of selector device the various components are similar both in structure and in function to the slide members, springs, positioning bar and other components used in the principal form of the invention.

The selector device 102 comprises a box-shaped casing 106 having end walls 107 and 108 and top and bottom walls 109 and 110 and a back wall 112. Within the casing 106 there is positioned a longitudinally slidable bar 113 which extends through slots 114 and 115 in the end walls 109 and 110 respectively. The positioning bar 113 has a plurality of pins 116, 117, 118 and 119 positioned thereon according to selected gear positions for the bar 113. The pins 117 and 119 project upwardly from plane of the bar 113, as viewed in Fig. 9 while the pins 116 and 118 project downwardly from the other side of the bar 113. Within the casing 106 there are provided a plurality of key slide members 120, 121, 122 and 123 which are positioned to have sliding movement laterally of the sliding bar 113 and which are operable to cooperate with the pins 116, 117, 118 and 119 to determine the position of the bar 113. The key slides 120 and 122 are positioned on one side of the bar 113 to cooperate with the pins 116 and 118 while the key slides 121 and 123 are positioned on the other side of the bar 113 and cooperate with the pins 117 and 119 respectively. The key slides have projections 124, 125, 126 and 127 at one end which extend through guide slots 128, 129, 130 and 131 respectively in the end wall 107 of the casing and which terminate in pushbuttons 132, 133, 134 and 135 respectively. The other ends of the key slides have projections 136, 137, 138 and 139 thereon which extend through slots 140, 141, 142, and 143 respectively in the end wall 108 of the casing. The projections 136, 137, 138 and 139 are surrounded by springs 144, 145, 146 and 147 which abut the end wall 108 and abut the portion of the respective key slides.

The key slides 120 and 122, which lie in back of the positioning bar 113 as viewed in Fig. 9 have cutout portions which provide V-shaped cam portions 148 and 150 which are positioned to cooperate with pins 116 and 118 on the positioning bar 113. The key slides 121 and 123 similarly have V-shaped cam portions 149 and 151 which are positioned to cooperate with pins 117 and 119 on the positioning bar 113. The V-shaped cam portions 148, 149, 150 and 151 respectively are operable to locate the respective ones of the pins 116, 117, 118 and 119 in the V portion thereof and thus fix the positioning bar 113 in a predetermined position corresponding to a desired gear setting for the automatic transmission.

The key slides 120, 121, 122 and 123 are each positioned through slots 156 in a latch bar 100 which is slidably mounted in the casing 106 and urged in the direction of the end wall 109 by a spring 160. The key slides 120, 121, 122, and 123 each have shoulders 152, 153, 154 and 155 respectively formed thereon which are arranged to abut and be held in position by the latch bar 100. The key slides 120, 121, 122 and 123 are also provided with cam surfaces 157 along the leading edge thereof in the direction of actuating movement so that the cam surfaces 157 may engage the latch bar upon actuation and move said bar to release the previously latched member for return to its initial unlatched position. The key slides 120, 121 and 122 are also provided with a notched portion 158 adjacent to the cam surface 157 which prevents actuation of the key slide when the selector device is in a safety position. The key slide 123 is the only one of the key slides which is not provided with the notched portion 158 and thus is the only key slide which is operable to move the latch bar for resetting from a safety operation.

On the outside of the casing wall 112 at the lower end portion thereof, there is supported a lever 163 which is pivotally supported as at 164. The lever 163 is connected through a pin 165 to one end of the cable 4 which extends to the automatic transmission 5. The lever 163 also has a pin 166 which extends through an arcuate slot or aperture 167 in a wall 112 of the casing. The pin 166 extends into a slot 168 in the positioning bar 113 for actuation thereby.

This apparatus is also provided with a safety slide member 170 which has a pair of projections 171 and 172 which extend through guide slots 175 and 176 in the casing wall 108 and a projection 173 which extends through a guide slot 174 in the casing wall 107. The projections 171 and 172 are surrounded by springs 179 and 180 which abut the casing wall 108 and the body portion of the slide member 170 and urge the slide member 170 to the right as viewed in Fig. 9. The safety slide member 170 has a V-shaped slot 177 therein with a straight slotted portion 178 extending from the base of the V and aligned with the overtravel slot portion 159 of the key slide 123 (which is arranged to establish a neutral position for the positioning bar 113). The safety slide member 170 is also provided with a pair of fingers 181 and 182 which extend into the path of movement of the neutral gear slide 123 to provide a convenient means for resetting the slide 170 after a safety operation.

The safety slide member 170 is held in position disengaged from the pin 119 on the positioning bar 113 by a latch structure which includes a supporting bar 183 which is supported in slots in ears 184 and 185 extending outwardly from the end walls 108 and 107 of the casing 106. The supporting member 183 has a pivoted latch member 186 supported thereon which has a laterally bent finger portion 187 which extends through an arcuate slot 188 in the supporting member 183. The latch finger portion 187 is held by a spring 190 in engagement with a notch 191 in the safety slide member 170. The supporting member 183 for the latch finger 187 is pivotally connected as at 189 to the latch bar 100 for movement therewith.

In the operation of this modification of the transmission control the actuation of the automatic transmission 5 is determined by movement of the control cable 4 to selected portions by the lever 163 in substantially the same manner as the positioning device described in connection with Figs. 1 to 5. The movement of the lever 163 is governed by the longitudinal sliding movement of the positioning bar 113 through the interconnection of the pin 166 and slot 168.

In Fig. 9 the pushbutton 135 and key slide 123 are shown in an actuated position with the positioning bar 113 located in a neutral gear position as determined by the V-shaped cam slot 151 and the overtravel slot 159 which engage the actuating pin 119. When pushbutton 132 is depressed as indicated by the arrow in Fig. 9, the key slide 120 is moved through the slot 156 in the latch bar 100. This movement of the key slide 120 causes the inclined face or cam surface 157 to engage the lower edge of the slot 156 and move the latch bar 100 downwardly as viewed in Fig. 9. This movement of the latch bar 100 by the cam surface 157 will cause the latch bar to be moved out of engagement with the latching shoulder 155 on the key slide 123. The latching relation between the latch bar 100 and the shoulder 155 on key slide 123 are shown more clearly in Fig. 7. When the latch bar 100 is moved out of engagement with the latching shoulder 155 the key slide 123 is released and returned to the disengaged position by the spring 147, as shown in Fig. 10. The movement of the key slide 120 to a fully actuated position will permit the latch bar 100 to move into a latching position behind the latching shoulder 152 which holds the key slide 120 in an actuated position as shown in Fig. 10. When the key slide 123 was released and moved to a disengaged position the further movement of the key slide 120 causes its V-shaped cam surface 148 to engage the pin 116 and move the positioning bar 113 to a new position as shown in Fig. 10. It is therefore apparent that each successive actuation of one of the pushbuttons 132, 133, 134 or 135 will cause the key slide which is actuated by that pushbutton to be moved and will cause the cam surface 157 to move the latch bar 100 and unlatch the key slide which has been previously actuated to permit the same to move to its original unlatched position. The further movement of the pushbutton will cause the key slide member which is actuated thereby to be latched by the latch bar 100 and by the coaction of its V-shaped cam slot and the pin on the positioning bar 113 will establish a new position for the positioning bar and a new gear setting for the automatic transmission.

In the actuation of this form of positioning device it is seen that the key slide which has been previously actuated is released for return to a disengaged position before the key slide which is being actuated is fully moved to a fully actuated and latched position. It is therefore possible in this general type of actuating mechanism for an unsafe operating condition to occur. For example, if one of the pushbuttons were actuated far enough to release the key slide which was previously actuated and then that pushbutton were released the positioning bar would not be engaged by any of the key slides and would be free to move to any one of the possible positions of actuation. In such a condition the operator of the vehicle might believe that the selector device had been actuated to place the car in a desired gear setting when in fact the positioning device might be in an entirely different gear setting.

To overcome this dangerous condition this selector device is provided with the safety slide member 170. The safety slide member 170 is held in position by the latch finger 187 on the latch supporting member 183 which is pivotally connected to the latch bar 100. So long as any one of the key slides 120, 121, 122 or 123 is in a actuated and latched position the latch finger 187 will remain in the latching notch 191 and retain the safety slide member 170 in the position shown in Fig. 9. If however, the unsafe condition occurs which was previously described where one of the pushbuttons has been partially actuated and then released with the result that all of the key slides 120, 121, 122 and 123 are in a position disengaged from the pins 116, 117, 118 and 119 and are all out of latching engagement with the latch bar 100, the latch bar 100 is moved upwardly by the spring 160 to the position shown in Fig. 6. When the latch bar 100 is moved to this position, the supporting member 183 is moved therewith and the the latch finger 187 is moved out of engagement with the latching notch 191 on the safety slide member 170. The release of the latching finger 187 permits the springs 179 and 180 to move the safety slide member 170 to the right as viewed in Fig. 9 to the position shown in Fig. 6. This movement of the safety slide member 170 will cause its cam surface 177 and 178 to engage the pin 119 and move the positioning bar 113 to the position shown in Fig. 6 which is the neutral gear setting for the automatic transmission. When the latch bar 100 is moved to the position shown in Fig. 6 the notched portions 158 of the key slides 120, 121, and 122 are engageable with the latch bar to prevent movement of the pushbuttons 132, 133, and 134. When it is desired to reset the safety slide member 170 from the position shown in Fig. 6 the neutral gear pushbutton 135 must be actuated. The movement of the pushbutton 135 will cause the key slide 123 to engage the fingers 181 and 182 on the safety slide member 170 to move that member to the left as viewed in Fig. 6. The overtravel slot 159 in the key slide 123 will permit actuation of the key slide 123 beyond the movement permitted the other key slides so that the safety slide 170 may be moved until the latching finger of 187 is again in latched position in the latching notch 191. It will thus be apparent to any operator of an automatic transmission using this positioning device that one of the pushbuttons 132, 133, 134 or 135 must be depressed at all times or the selector device will be in a safety position with the safety slide member 170 in the position shown in Fig. 6. If the operator of the vehicle sees that none of the pushbuttons are depressed, it is then necessary that the neutral gear pushbutton 135 be pushed to reset the safety slide member 170 before any of the driving gear pushbuttons can be actuated.

We claim:

1. A positioning device including in combination, an elongated bar member mounted for longitudinal sliding movement, a plurality of members movable laterally of said bar member and including means engageable with said bar member to position and retain said bar member at a predetermined position, said members having an operative position in which said means thereon engages said bar member and being biased to a nonoperative position, latch means engageable with each of said movable members upon movement thereof to said operative position to secure the same in said operative position, with said latch means being releasable during the movement of each movable member to establish a new position for said bar member, and safety means cooperable with said bar member to hold the same in a predetermined position upon occurrence of a condition in which none of said movable members is in operative position.

2. A positioning device including in combination, an elongated bar member mounted for longitudinal sliding movement, a plurality of abutments on said bar member, a plurality of slide members mounted for movement laterally of said bar member and each having a cam portion engageable with one of said abutments upon a predetermined lateral movement to position and retain said bar at a predetermined position. latch means engageable with each of said slide members upon said predetermined movement to hold the same with the cam portion engaging one of said abutments, said latch means being releasable during movement of each slide member through said predetermined movement to release said previously latched slide member and establish a new position for said bar, and safety means cooperable with said bar to hold the same in a predetermined position upon occurrence of condition in which none of said slide members are in a latched position.

3. A selector device for an automatic transmission for an automobile which is controlled by movement of a control cable to a plurality of control positions corresponding to forward, reverse, and neutral positions, which device includes an elongated bar adapted to be connected to the control cable and mounted for longitudinal sliding movement, a plurality of spaced abutments on said bar, a plurality of slide members corresponding in number to the gear positions and slidable laterally of said bar, said slide members each being biased to an initial disengaged position having a V-shaped cam portion engageable with one of the abutments on said bar upon predetermined movement to position and retain said bar at a predetermined position corresponding to a predetermined control position of the transmission control cable, latch means engageable with each of said slide members upon said predetermined movement to secure the same against its bias with its V-shaped cam portion in operative engagement with an abutment on said bar, said latch means being moved to release a previously latched slide member during movement of each slide member to said predetermined movement to establish a new position for said bar, and safety means cooperable with said bar to hold the same in a predetermined safe position upon occurrence of a condition in which none of said slide members is in a latched position.

4. A positioning device including in combination, an elongated bar member mounted for longitudinal sliding movement, a plurality of members movable laterally of said bar member and including means engageable with said bar member to position and retain said bar member at a predetermined position, latch means engageable with each of said movable members upon said predetermined movement to secure the same in a predetermined position in operative engagement with said bar member, said latch means being moved to release a previously latched movable member during movement of each movable member through said predetermined movement to establish a new position for said bar member, a movable safety member initially latched in a disengaged position and engageable with said bar member to hold the same in a predetermined safe position, and said safety member being released upon occurrence of a condition in which none of said movable members is in a latched position.

5. A selector device for an automatic transmission for an automobile which is controlled by movement of a control cable to a plurality of control positions corresponding to forward, reverse, and neutral gear positions, which device includes an elongated bar adapted to be connected to the control cable and mounted for longitudinal sliding movement, a plurality of spaced abutments on said bar, a plurality of slide members corresponding in number to the gear positions and slidable laterally of said bar, said slide members each being biased to an initial disengaged position and having a V-shaped cam portion engageable with one of said abutments on said bar upon predetermined movement to position and retain said bar at a predetermined position corresponding to a predetermined control position of the transmission control cable, latch means engageable with each of said slide members upon said predetermined movement to secure the same against its base with its V-shaped cam portion in operative engagement with an abutment on said bar, said latch means being moved to release a previously latched slide member during movement of each slide member through said predetermined movement to establish a new position for said bar, a slidable safety member initially latched in a disengaged position and having a cam portion engageable with an abutment on said bar to move the same to a position corresponding to the neutral gear position of the automatic transmission, said latch means being cooperable with said safety member to hold the same in an initial disengaged position so long as one of said slide members is in a latched position, and said latch means being operable to release said safety member upon occurrence of a condition in which none of said slide members is in a latched position.

6. A positioning device including in combination, an elongated bar mounted for longitudinal sliding movement, a plurality of spaced pins on said bar, a plurality of spaced slide members mounted for movement laterally of said bar and each having a V-shaped cam portion, spring means urging said slide members to an initial disengaged position, each of said V-shaped cam portions being engageable with one of said pins upon predetermined lateral movement to position and retain said bar at a predetermined position, a latch bar engageable with said slide members upon said predetermined movement to hold the same against said spring means with the cam portion engaging one of said pins, a cam surface on each of slide members operable to move said latch bar upon predetermined movement of any one of said slide members to release a previously latched slide member, a safety slide member engageable with one of said pins to establish a selected safe position for said bar, latch means holding said safety slide member in a normally disengaged position, and said latch means being responsive to the occurrence of a condition in which none of said slide members are in a latched position to release said safety slide member for engagement with one of said pins on said bar to establish said safe position therefor.

7. A selector device for an automatic transmission for an automobile which is controlled by movement of a control cable to a plurality of control positions corresponding to forward, reverse, and neutral gear positions, which device includes an elongated bar adapted to be connected to the control cable and mounted for longitudinal sliding movement, a plurality of spaced pins on said bar, a plurality of spaced slide members corresponding in number to the gear positions and slidable laterally of said bar, said slide member each having a V-shaped cam portion and a latching shoulder, spring means urging each of said slide members to an initial disengaged position, each of said V-shaped cam portions being engageable with one of said pins on said bar upon predetermined movement to position and retain said bar at a predetermined position corresponding to a predetermined gear setting of the transmission control cable, a latch bar having slots through which said slide members extend and spring biased toward engagement with the latching shoulder of said slide members to latch the same against said spring means with said V-shaped cam portion in operative engagement with one of the pins on said bar, each of said slide members having a latch-releasing cam surface engageable upon predetermined movement with said latch bar to move the same out of engagement with the previously latched slide member, a safety slide member having a V-shaped cam portion engageable with the pin on said bar corresponding to a neutral gear setting and having fingers extending into the path of the slide member which is movable to establish the neutral gear setting of said bar, a latch member engageable with said safety slide member to retain the same in a position normally disengaged from said pin, said latch member being connected to said latch bar and movable thereby to release said safety slide member when none of said slide members is in a latched position, the slide member corresponding to the neutral gear setting having a slot extending from the V-shaped cam portion thereof to permit overtravel, and the neutral gear positioning slide member being operable upon movement to engage the fingers on said safety slide member to reset the same after a safety operation thereby.

8. A positioning device including in combination, an elongated bar member mounted for longitudinal sliding movement, a plurality of laterally movable members each including means engageable with said bar member over a predetermined lateral distance to position said bar member over a longitudinal distance less than said predetermined lateral distance and to retain said bar member at a predetermined position, latch means including a first portion on each movable member in frictional engagement with a second portion of said latch means upon movement of said movable member over said predetermined lateral distance and in a first direction, whereby said latch means secures said movable member in a predetermined lateral position in operative engagement with said bar member, and spring means coupled to said movable members and to said latch means for biasing said movable members in a direction opposite to said first direction and for holding said portions of said latch means in engagement to secure said movable members in the predetermined position, said latch means being releasable upon application of a predetermined force to the latched movable member in a direction opposite to said first direction to overcome the frictional forces securing the same in said predetermined position, said means of said movable members engageable with said bar member each being operatively engageable with said bar member to also reposition the same, whereby the ratio of lateral to longitudinal movement causes the resultant longitudinal force applied to said bar member by said means engageable therewith to be greater than the lateral actuating force applied to said movable members and thereby provides a mechanical advantage for longitudinally positioning said bar member but which advantage is reversed in the application of said resultant longitudinal force to said latched movable member in providing the predetermined lateral unlatching force required to release the same.

9. A selector device for an automatic transmission of an automobile including in combination, an elongated bar member mounted for longitudinal sliding movement to different positions, means coupling said bar member to the transmission to control the same in accordance with the position of said bar member, a plurality of abutments in fixed positions on said bar member, a plurality of laterally movable slide members each including a V-shaped cam portion for engagement with one of said abutments on said bar member, each of said slide members being movable in a first direction to an operated position with said cam portion thereof engaging said abutment over a predetermined lateral distance to position said bar member over a longitudinal distance less than said predetermined lateral distance, a plurality of latch means individually associated with said slide members and each including a first portion on each slide member and a second portion in frictional engagement therewith upon movement of said slide member to an operated position to position the associated abutment, whereby said latch means secures said slide member in said operated position, and spring means coupled to said members and to said latch means for biasing said slide members in a direction opposite to said first direction and for holding said portions of said latch means in engagement to secure a latched slide member in the operated position, said latch means being releasable upon application of a predetermined force to the latched slide member in a direction opposite to said first direction to overcome the frictional forces securing the same in said operated position, said cam portions of said slide members each being operatively engageable with the associated abutment on said bar member to reposition the same, whereby the ratio of lateral to longitudinal movement causes the resultant longitudinal force applied to said bar member by said slide member engageable therewith to be greater than the lateral actuating force applied to said slide member and thereby provides a mechanical advantage for longitudinally positioning said bar member, but which advantage is reversed in providing the predetermined lateral unlatching force required to release a latched slide member.

10. A selector device for an automatic transmission of an automobile including in combination, an elongated bar member mounted for movement to different positions, means coupling said bar member to the transmission to control the same in accordance with the position of said bar member, a plurality of cam elements in fixed positions on said bar member, a plurality of laterally movable slide members each including a cam portion for engagement with one of said cam elements on said bar member, each of said slide members being movable in a first direction to an operated position with said cam portion thereof engaging said cam element to position said bar member, a plurality of independent latch means individually associated with said slide members and each including a first portion on each slide member and a second portion in frictional engagement therewith upon movement of said slide member to an operation position to position the associate cam element, whereby said latch means selectively latches said slide members in said operated position, and spring means coupled to said members and to said latch means for biasing said slide members in a direction opposite to said first direction and for holding said portions of said latch means in engagement to secure a latched slide member in the operated position, said latch means being releasable upon application of a predetermined force to the latched slide member in a direction opposite to said first direction to overcome the frictional forces securing the same in said operated position, each unlatched slide member being movable to cause engagement of said cam portion thereof with the associated cam element on said bar member to move the same and reposition said bar member, with movement of said bar member by action of said cam portion of one slide member causing movement of the other cam elements on said bar member and thereby tending to move said cam portion of any other slide member held in operated position by the associated latch means, with such latched slide member being released to permit movement of said bar member in response to a force applied thereto by the associated cam element through said bar member at least equal to said predetermined force.

11. A positioning device including in combination, an elongated bar mounted for longitudinal sliding movement to predetermined positions, a plurality of abutments in fixed positions on said bar, a plurality of slide members mounted for movement laterally of said bar and each having a V-shaped cam portion engageable with one of said abutments, each of said slide members being laterally movable to an operated position to position said bar in one of said predetermined positions by means of cam action of said cam portion thereof against the associated abutment, a plurality of independent latch means individually coupled to said slide members and each including portions frictionally engageable when the associated slide member is in the operated position to latch the same in operated position with the cam portion thereof engaging the associated abutment to retain said bar in the selected position, and spring means coupled to said slide members and to said latch means for urging said slide members in a direction away from said abutments and for providing frictional engagement of said portions of said latch means, each of said latch means being releasable upon the application of a predetermined force to the associated slide member in the direction away from said abutments, each unlatched slide member being movable so that said cam portion thereof engages the associated abutment to move the same and reposition said bar, with movement of said bar causing movement of the other abutments thereon and thereby tending to move any latched slide member in the direction away from said abutments through engagement of said cam portion thereof with the associated abutment, with such latched slide member being released to permit movement of said bar in response to a force applied thereto by the associated abutment through said bar at least equal to said predetermined force.

References Cited in the file of this patent
UNITED STATES PATENTS

| | | |
|---|---|---|
| 2,253,433 | Kellogg | Aug. 19, 1941 |
| 2,296,721 | Lyman et al. | Sept. 22, 1942 |
| 2,318,554 | Raney | May 4, 1943 |
| 2,335,812 | Steffens | Nov. 30, 1943 |
| 2,340,393 | Leishman | Feb. 1, 1944 |
| 2,518,825 | Simpson | Aug. 15, 1950 |